United States Patent [19]

Cotton

[11] Patent Number: 4,510,778
[45] Date of Patent: Apr. 16, 1985

[54] CONTROL SYSTEM FOR A COMBINED APPLIANCE

[75] Inventor: Curran D. Cotton, Newton, Iowa

[73] Assignee: The Maytag Company, Newton, Iowa

[21] Appl. No.: 565,735

[22] Filed: Dec. 27, 1983

[51] Int. Cl.³ .................... D06F 29/00; D06F 33/02
[52] U.S. Cl. ........................................ 68/12 R; 68/20
[58] Field of Search ............... 68/3 R, 12 R, 13 R, 68/19.2, 20, 26

[56] References Cited

U.S. PATENT DOCUMENTS

| 2,668,432 | 2/1954 | Emmert | 68/26 |
| 2,887,864 | 5/1959 | Tegerdine | 68/26 |
| 2,954,688 | 10/1960 | Smith | 68/12 R |
| 3,139,744 | 7/1964 | Van Alstyne et al. | 68/20 |
| 3,508,340 | 4/1970 | Kombol | 68/12 R X |

Primary Examiner—Philip R. Coe
Assistant Examiner—Frankie L. Stinson
Attorney, Agent, or Firm—Richard L. Ward

[57] ABSTRACT

A control system is provided for controlling the operation of a plurality of associated appliances. The appliances are individually powered from separate power sources. A single control panel is mounted on one of the appliances and includes selection switches for operator input of cycle information corresponding to each of the appliances and also includes display apparatus. A single controller is in circuit communication with the power supply of one appliance, the selection switches and the display apparatus and outputs data signals to a driver which outputs data signals to control operation of the appliances and the display apparatus. The driver is operable for outputting a series of multiplexed data signals on outputs to the appliances, the display apparatus and the selection switches so that the controller is operable for effecting selective and independent operation of one or concurrent and independent operation of more than one of a plurality of associated appliances. Low voltage cabling is provided between the controller and each appliance for carrying data signals to each appliance.

9 Claims, 9 Drawing Figures

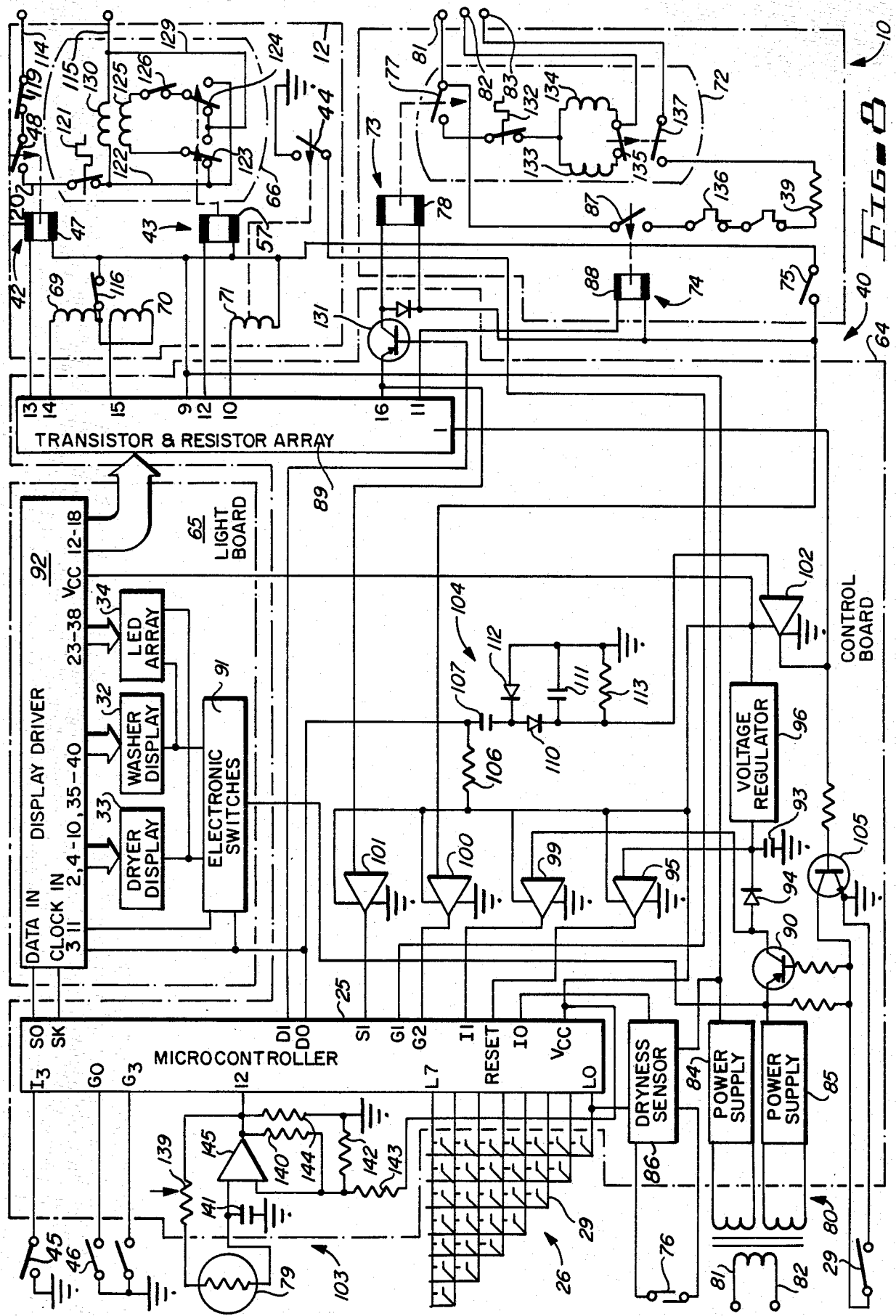

CONTROL SYSTEM FOR A COMBINED APPLIANCE

BACKGROUND OF THE INVENTION

This invention relates generally to the field of control systems for appliances and more particularly to a control system wherein a single microcontroller is utilized for controlling a plurality of associated appliances.

Prior art control systems have included the use of a centralized coin operated mechanism for operating a plurality of commercial washing machines from a single location such as disclosed in U.S. Pat. No. 3,076,107 issued on Jan. 29, 1963 to Johnstone. In this system, when a coin is inserted a washer may be actuated by pushing a switch button at the remote location to energize a low voltage relay to close contacts for energizing a high voltage solenoid to actuate the self-contained timer for a particular washing machine.

Wells, in U.S. Pat. No. 3,531,791, issued Sept. 29, 1970, teaches the use of remotely located indicating apparatus for monitoring the cycle position of a washing machine and a fabric dryer. Low voltage wiring is utilized and the appliances must be properly grounded before the indicating apparatus will function.

Gillespie, in U.S. Pat. No. 4,335,591, issued June 22, 1983, provides a laundry system for use in institutions or the like where a plurality of washing machines can be operated simultaneously while each machine is monitored to prevent simultaneous spin, detergent dispensing or other operations which should be completed on an individual basis. Each washing machine has a controller and each controller is connected to all of the other controllers so that they can communicate to permit only one washing machine to perform a common function at a particular point in time.

Albert, in U.S. Pat. No. 4,390,965, issued on June 28, 1983, teaches a control system where one controller controls the starting and stopping of a plurality of microwave ovens so that all of the ovens can be shut off simultaneously. At the proper time, relative to the longest cooking time, the controller will effect the turn-on of individual ovens so that all will be done at the same time.

The prior art has thus included systems which are directed to a centralized single coin mechanism for operating a plurality of commercial appliances, to remote indicating apparatus for monitoring the cycle position of appliances, to utilizing one controller for coordinated starting and stopping of a plurality of appliances, and to institutional laundry systems where a plurality of washing machines may be operated simultaneously with each washing machine having its own controller and with the controllers monitored to prevent simultaneous operation of the washing machines in a common function. There has been no known showing of a control system where a single microcontroller is utilized to control mutually independent operation of a plurality of associated appliances through preselected cycles of operation on a singular or concurrent basis.

SUMMARY OF THE INVENTION

It is therefore an object of the instant invention to provide an improved control system for a plurality of appliances.

It is a further object of the instant invention to provide a control system wherein a single controller is operable for independently controlling a plurality of associated appliances.

It is a still further object of the instant invention to provide a control system where the appliance control panel is selectively associated with one of a plurality of appliances.

Briefly, the instant invention achieves these objects in a control system for controlling the operation of a plurality of associated appliances. A power supply provides line current to each appliance. A control panel includes selection switches for inputting cycle information corresponding to each of the appliances and further includes a display for each of the appliances. A controller includes a microcontroller in communication with the selection switches and the power supply. Low voltage interconnecting wiring extends between the control and the operating components of each of the appliances for carrying operational data signals from the control to each of the appliances to effect selective and independent operation of one or concurrent and independent operation of more than one of the appliances.

Operation of the control system and further objects and advantages thereof will become evident as the description proceeds and from an examination of the accompanying four sheets of drawings.

BRIEF DESCRIPTION OF THE DRAWINGS

The drawings illustrate a preferred embodiment of the invention with similar numerals referring to similar parts throughout the several views, wherein:

FIG. 8 is an electrical schematic drawing of the control circuitry for the combined appliance of FIG. 1.

DESCRIPTION OF A PREFERRED EMBODIMENT

Figure 1:
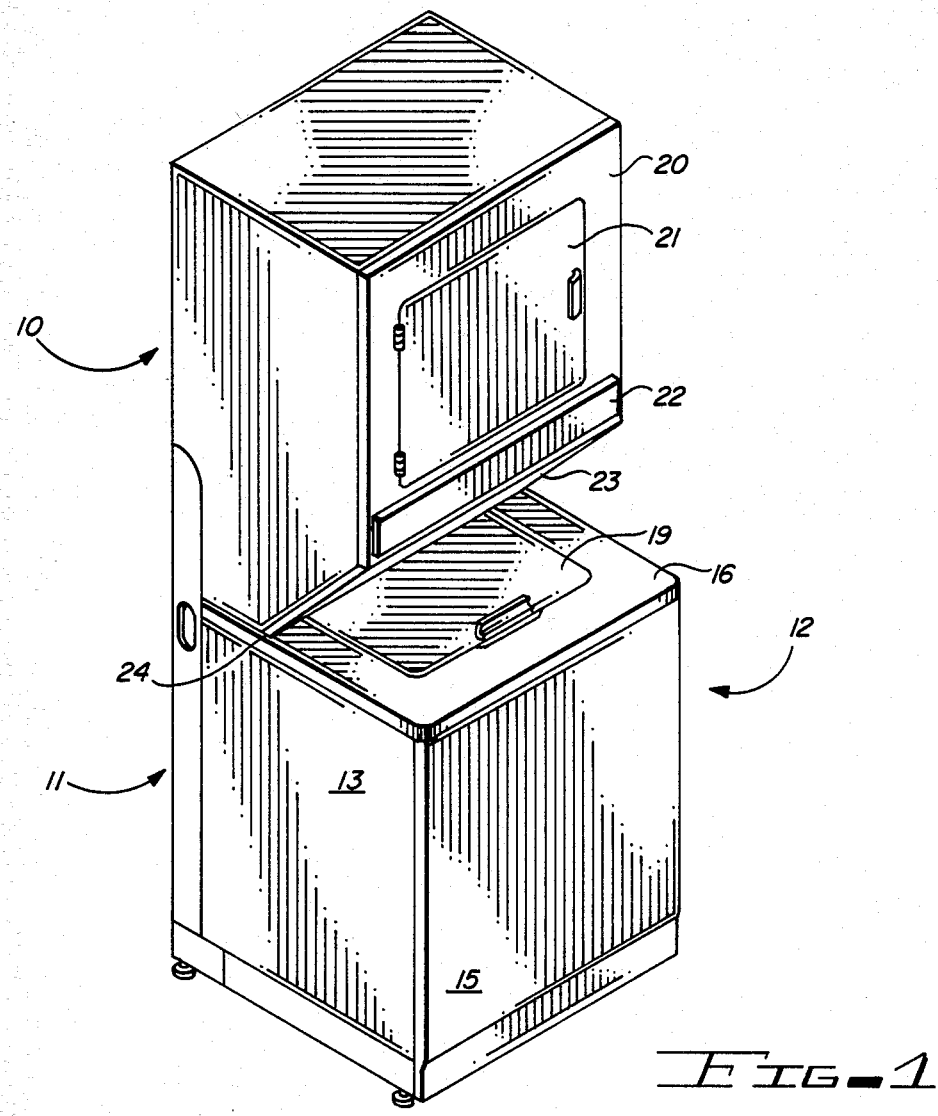
FIG. 1 is an isometric view of a washer/dryer combined appliance mounted in a stack arrangement through a support stand.

Referring now to the drawings, there is best shown in FIG. 1 a pair of laundry appliances with a fabric dryer 10 mounted on an appliance support stand 11 above an automatic washer 12.

Figure 3:
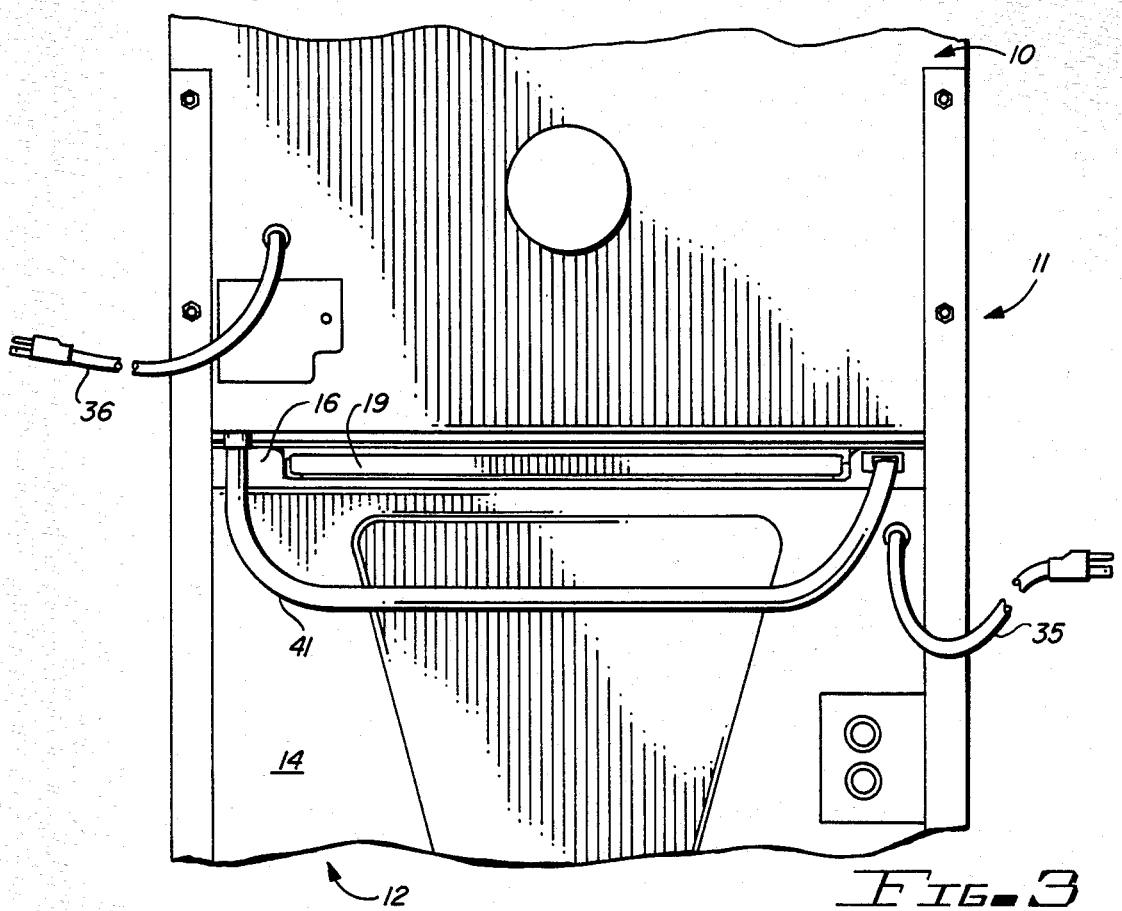
FIG. 3 is a partial rear view of the combined appliance of FIG. 1 showing individual power connections and interconnecting low voltage cable.

Briefly, in this embodiment of the invention, the automatic washer 12 is housed within a generally rectangular cabinet having a three-sided enclosure member forming the sides 13 and rear wall 14 of the cabinet as best shown in FIGS. 1 and 3. A vertically oriented front panel 15 completes the peripheral cabinet enclosure of the automatic washer 12. The cabinetry of the automatic washer 12 also includes a substantially horizontal top cover 16 having a slidable access door 19 for providing access to the interior of the automatic washer 12.

The fabric dryer 10 is shown mounted in a cantilevered fashion on the support stand 11 directly above the automatic washer 12 and also has a generally rectangular enclosure which is substantially shorter in front-to-rear depth than that of the automatic washer 12. The vertically oriented fabric dryer front panel 20 includes an access door 21 for loading and unloading the fabrics to be dried. Controls, such as control panel 22, may be positioned on the fabric dryer 10 and/or automatic washer 12 through which the washing machine 12 and fabric dryer 10 are controlled. As further shown in FIG. 1, the lower front panel 23 of the fabric dryer 10 tapers rearwardly from a point adjacent the bottom edge of the front panel 20. The lower edge 24 of the fabric dryer 10 lower front panel 23 is adjacent to but spaced slightly above the top cover 16 of the automatic washer 12.

Figure 2:
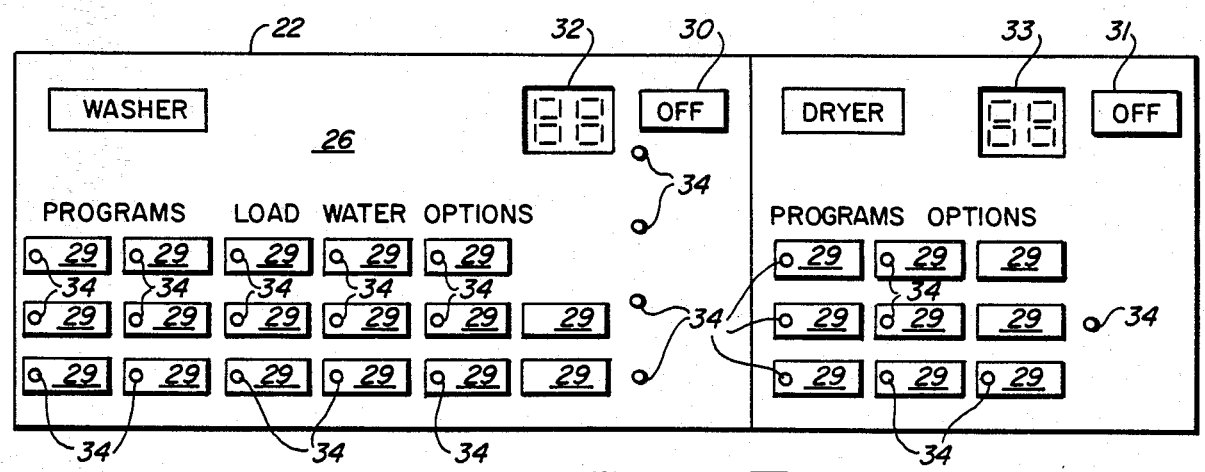
FIG. 2 is representative of a control panel configuration for the combined appliance of FIG. 1.

FIG. 2 shows the general layout of the control panel 22 which is located just below the access door 21 of the fabric dryer 10 of the combined laundry appliance shown in FIG. 1. In this embodiment, the control panel 22 is divided into separate control sections for the automatic washer 12 and the fabric dryer 10. As will be discussed further herein, the automatic washer 12 and the fabric dryer 10 may be operated individually or concurrently through a single microcontroller 25 as depicted in the schematic circuit of FIG. 8. The control panel 22 of FIG. 2 includes a membrane switch keyboard 26 with a plurality of selection pads or switches 29 associated with the automatic washer 12 and the fabric dryer 10 for selecting desired programs and program options and communicating the selections to the microcontroller 25. Both the automatic washer 12 and the fabric dryer 10 include an off pad 30 or 31, a display 32 or 33 for indicating cycle time and a plurality of LEDs 34 associated with the various selection pads or switches 29 to indicate the selected program options.

The rear of the combined appliance of FIG. 1, which is shown in FIG. 3, best indicates that the automatic washer 12 and the fabric dryer 10 are individually powered by line current through separate power cords 35 and 36. The particular embodiment of the combined appliance shown in the schematic circuit of FIG. 8 has 120 VAC supplied to the automatic washer 12 and 240 VAC supplied to the fabric dryer 10 since this embodiment utilizes an electric heater 39. As previously indicated, the control panel 22 is secure to one of the appliances such as the fabric dryer 10 and the control circuitry 40 of FIG. 8 derives its power from the line current for the fabric dryer 10. As further shown in FIG. 3, a low voltage interconnecting cable 41 extends between the cabinet bottom of the fabric dryer 10 and the rear of the top cover 16 of the automatic washer 12 for carrying low voltage signals from the control circuitry 40 to various components within the automatic washer 12 such as control relays 42 and 43, access door lock switch 44, pressure switch 45 and the unbalance switch 46.

Figure 4:
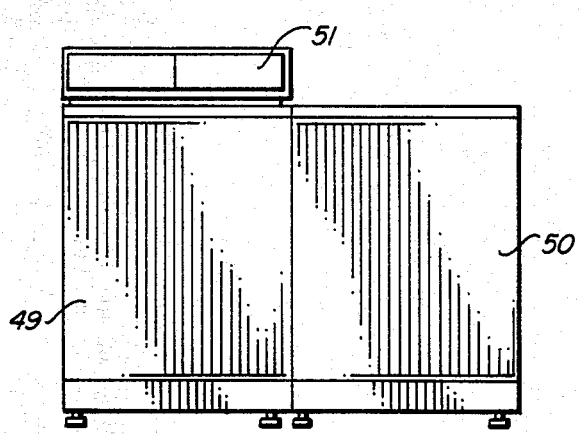
FIGS. 4-7 illustrate alternate appliance arrangements for use with the control system.
Figure 5:
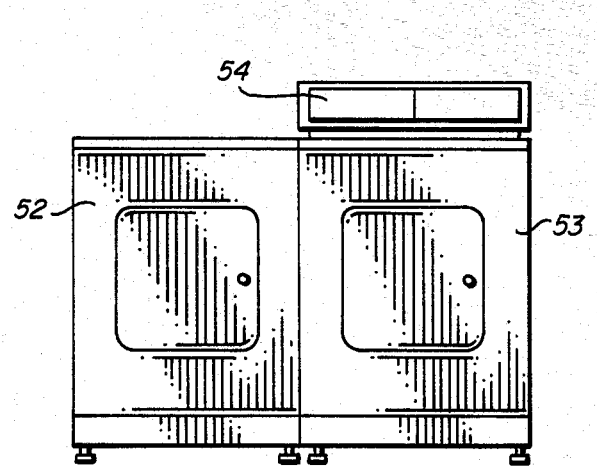
Figure 6:
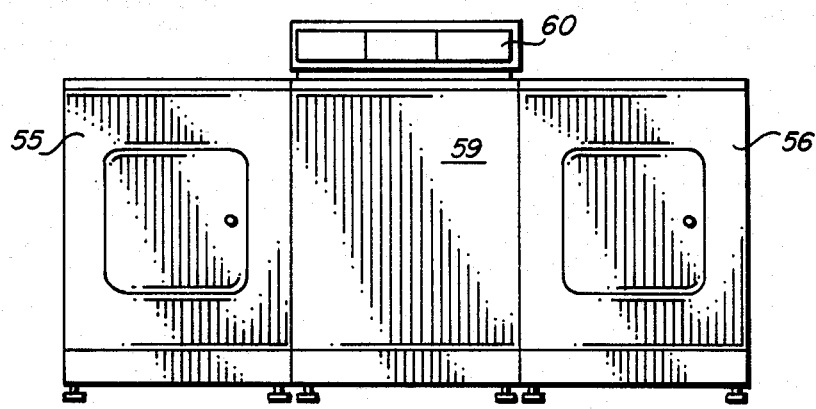
Figure 7:
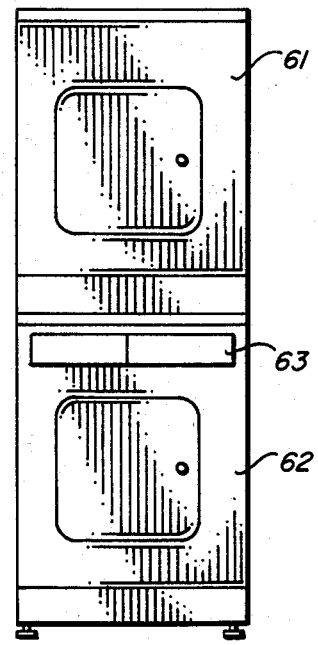

FIG. 1 shows a specific embodiment of a combined laundry appliance with a fabric dryer 10 mounted on a support stand 11 above an automatic washer 12. The concept of controlling more than one appliance with a single microcontroller 25 as shown in FIG. 8 is not, however, to be limited to this particular arrangement. FIGS. 4–7 show a plurality of possible combined laundry appliance configurations with the imagination being the only limitation as to possible combinations. Also, this appliance control is not to be limited to use with only laundry appliances. FIG. 4 shows a pair of automatic washers 49 and 50 with the control panel 51 mounted on the left washer 49. FIG. 5 depicts a pair of fabric dryers 52 and 53 with the control panel 54 mounted on the right fabric dryer 53. FIG. 6 shows a pair of fabric dryers 55 and 56 combined with a single automatic washer 59 and having the control panel 60 mounted on the automatic washer 59. FIG. 7 shows a pair of fabric dryers 61 and 62 stacked one on the other and with the control panel 63 associated with the lower fabric dryer 62. The use of a single microcontroller 25 for a plurality of appliances results in several advantages; portions of the microcontroller 25 can be shared, some hardware duplication can be avoided and a larger microcontroller 25 with more features can be utilized.

Turning now to FIG. 8, there is shown an electrical circuit 40 for the combined fabric dryer 10 and automatic washer 12 appliance as depicted in FIGS. 1–3. The electrical circuit 40 of FIG. 8 includes a pair of circuit boards 64 and 65 with the circuitry of the boards 64 and 65 generally outlined in dashed lines and with the boards 64 and 65 labeled "control board" and "light board". Various components associated with these circuit boards 64 and 65, but not physically mounted thereon, such as the automatic washer drive motor 66 and its relays 42 and 43, hot and cold water valves 69 and 70, access door lock switch solenoid 71, pressure switch 46, unbalance switch 45, fabric dryer drive motor 72 and its relay 73, fabric dryer heater 39 and its relay 74, fabric dryer door switch 75, fabric dryness sensors 76, thermistor temperature sensor 79, keyboard 26 and transformer 80 are shown outside the dashed line perimeter of the circuit boards 64 and 65.

The transformer 80, located away from but connected to the control board 64, is powered by 120 VAC across conductors 81 and 82 supplying power to the fabric dryer 10. The transformer 80 supplies 26.4 VAC and 10 VAC to a pair of bridge rectifiers not shown but associated with power supplies 84 and 85 respectively.

The 26.4 VAC exits power supply 84 at 25 VDC to the dryness sensor 86, the automatic washer relays 42 and 43, the fabric dryer relays 73 and 74 through the dryer door switch 75, the automatic washer water valves 69 and 70 and to the transistor and resistor array 89 through pin or terminal 9.

The 10 VAC exits power supply 85 at 8.6 VDC to switching transistor 90 and to the rectangle 91 labeled "electronic switches" located on the light board 65 where the 8.6 VDC is regulated and switched according to outputs "3" and "11" of the display driver 92 to selectively power the LED array 34 and displays 32 and 33. The switching transistor 90 is turned on when one of the nine program switches 29 for the automatic washer 12 or fabric dryer 10 shown in FIG. 2 are closed. Filter capacitor 93 is then charged to approximately 11 VDC through the blocking diode 94. This 11 VDC is then available to the low voltage detector circuit 95 and to the voltage regulator 96. The low voltage detector circuit 95 will provide a reset of the microcontroller 25 if the voltage input at the voltage regulator 96 is less than about 7 VDC. The voltage regulator 96 when supplied with an input voltage of greater than or equal to 7 VDC, provides 5 VDC (VCC) to operate the control circuitry 40. The 8.6 VDC is also used to provide a 120 Hz. square wave pulse through pulse generator circuit 99 to a real time clock for timing and control of the combined appliance.

The microcontroller 25 shown in FIG. 8 is, in the preferred embodiment of the invention, a National Semiconductor COP440 single chip N-channel microcontroller. The microcontroller 25 is adapted for serially outputting data on output "SO" to a "data in" input on a National Semiconductor MM545ON display driver 92 which is represented by a rectangle 92 labeled "display driver" in FIG. 8. The microcontroller 25 also provides a synchronizing pulse at output "SK" to shift data on the "SO" output into the "data in" input of the display driver 92.

The display driver 92 is operable for driving the pair of two digit displays 32 and 33 and the LED array 34 associated with the automatic washer 12 and the fabric dryer 10 through outputs 2, 4–10, 35–40 and 23–38. The display driver 92 also outputs data on outputs 12–18 to a Sprague ULN-28X1A transistor and resistor array 89 for driving the various relays and solenoids associated with the automatic washer 12 and fabric dryer 10.

Returning to the power supply circuitry, the 5 VDC output of the voltage regulator 96 provides low voltage operating current for the microcontroller 25, the display driver 92, the amplifier circuits 95, 99, 100, 101, 102 and for the temperature sensing circuit 103 of the fabric dryer 10.

The fabric dryness sensor 86 is electrically connected to a pair of sensor bars or electrodes 76 located within the fabric tumbling chamber of the fabric dryer 10. The conductivity of the clothes load in the fabric dryer 10 is used as an input to a software programmable amplifier located within the rectangle 86 labeled "dryness sensor" in FIG. 8. By controlling the state of port "L0" of the microcontroller 25, the gain is controlled to differentiate between wet fabrics and metal. The output of a transistor switch is read by input "I0" of the microcontroller 25 and variation of the final dryness is achieved by a software algorithm.

Input ports "L0-L7" of the microcontroller 25 are connect to the folded matrix of the control panel membrane switch keyboard 26. These eight input ports produce 28 keyboard program switches 28 which are decoded through the software for the combined appliance. One of the keyboard program switches 29 is isolated in the lower left corner of the electrical schematic circuit 40 to illustrate the method of latching the control system in an "on" posture once a keyboard program switch 29 has been selected. Once the microcontroller 25 is operating and the display driver 92 is functioning the missing pulse detector circuitry 104, which will be described herein, will latch transistor 105 and will maintain transistor 105 in an operational posture after the keyboard program switch 29 is opened.

Figure 9:
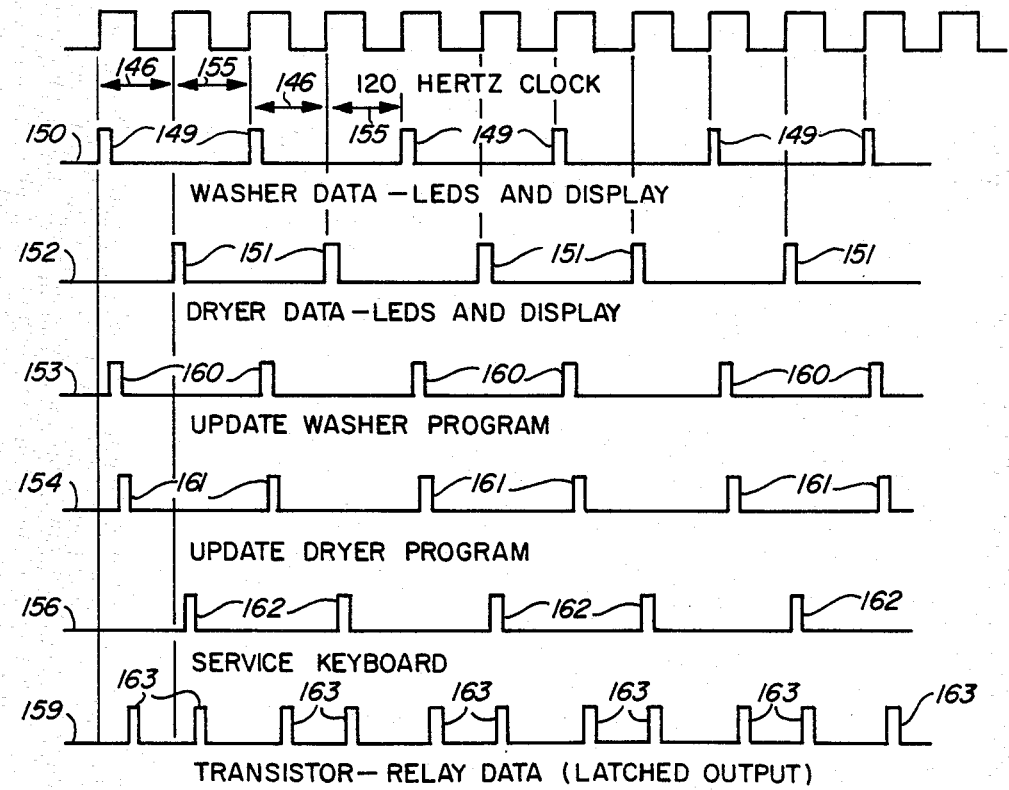
FIG. 9 is a timing chart corresponding to the control circuitry of FIG. 8 and shown out of order with FIG. 3.

The display driver 92 is operable for alternately outputting data signals at outputs "3" and "11" every other pulse 146 and 155 of the 120 Hz. clock. Every other 8.3 milliseconds a pulse will be output on either output "3" or output "11". These pulses are referred to as timing pulses or data signals and are illustrated in FIG. 9 which will be further discussed herein. Every other data signal updates circuitry associated with either the automatic washer display 32 and LEDs 34 or the fabric dryer display 33 and LEDs 34 through electronic switching circuitry located within the rectangle 91 labeled "electronic switches" on the light board 65 so that they are alternately energized in a multiplexing manner.

The missing pulse detector circuitry 104 ensures that the state of the combined appliance is always under control of the microcontroller 25. The voltage at the junction of resistor 106 and capacitor 107 is continually restored to 5 volts through resistor 106 after being pulled to a zero voltage condition by the display driver 92. Capacitor 107 allows the positive component of the 5 volt square wave produced at the junction of resistor 106 and capacitor 107 to flow through the diode 110 and charge capacitor 111. Capacitor 107 is also charged through diode 112 on the positive component of the 5 volt square wave. Capacitor 107 will be discharged through diode 112 on the negative component of the 5 volt square wave. Resistor 113 allows capacitor 111 to discharge over a period of time. Amplifier 102 will sense the charge on capacitor 111 which indicates that a 5 volt square wave is being generated at output "3". If this wave form is not present at output "3" of the display driver 92 it will be sensed through the amplifier 102 to effect the turn off of the latching transistor 105 and the transistor and resistor array 89. The missing pulse detector circuitry 104 thus protects against continuous appliance operation if the microcontroller 25 or display driver 92 should malfunction.

Input "I3" of the microcontroller 25 receives an input from a single pole-single throw switch 45 located within the automatic washer 12 adjacent the outer wash tub (not shown). When a large oscillation of the wash tub occurs, the switch 45 will be closed to ground and the microcontroller 25 will effect the turn of of the automatic washer relays 42 and 43.

Ports "G0" and "G3" of the microcontroller 25 receive data from a digital water level switch 46. This data is utilized to provide four different water levels to the automatic washer 12.

In the schematic circuit of FIG. 8, 120 VAC electrical power is supplied to the automatic washer 12 between conductors 114 and 115. The automatic washer 12 and the microcontroller 25 are initially powered by pressing a keyboard program switch 29 associated with the control panel 22 mounted on the fabric dryer 10 as illustrated in FIGS. 1 and 2. Prior to pressing a keyboard program switch 29, the access door 19 of the automatic washer 12 must be manually closed.

As a cycle of operations is initiated by the microcontroller 25, the access door lock switch 44 is addressed or interrogated to ensure that the switch contacts are open as they should be prior to actuating the solenoid 71 to close contacts of the access door lock switch 44 and latch the access door 19.

When the condition of the access door lock switch 44 has been checked by the microcontroller 25 to verify that the access door 19 is closed and locked, the microcontroller 25 will initiate energization of the run relay 42 and/or spin relay 43 of the drive motor 66 depending on the cycle selected. If, for example, a cycle requiring agitation is selected, the microcontroller 25 will first energize a tub fill circuit which includes the hot and cold water valves 69 and 70, the overflow switch 116, and the water level sensor 46 which will fill the tub of the automatic washer 12 to the proper level for washing clothes. Once the fill operation has been completed, the coil 47 of the run relay 42 will be energized through the microcontroller 25 and output 13 of the transistor and resistor array 89 to complete a circuit from conductor 114, through the access door switch 119, through relay switch contacts 48, through conductor 120, thermal protector 121, conductor 122, first spin relay switch 123, start winding 125, centrifugal switch 126, second spin relay switch 124, and conductor 129 to conductor 115. A parallel circuit is also completed through the run winding 130 to conductor 115. Once the drive motor 66 reaches run speed, the centrifugal switch 126 will open and the start winding 125 will drop out of the circuit allowing only the run winding 130 to be energized between conductors 114 and 115.

If a cycle selection calls for spin or rotation of the drive motor 66 in the reverse direction, the microcontroller 25 will first energize the coil 57 of the spin relay 43 through output 12 of the transistor and resistor array 89 to move the first and second switches 123 and 124 to a second posture. The run relay 42 will then be energized to complete the run circuit for the drive motor 66 but in an opposite direction of rotation from agitate since the start winding 125 will be energized in the reverse direction.

Port "G2" of the microcontroller 25 senses, through amplifier 100, the state of the fabric dryer door switch 75 which is a single pole-single throw switch for interrupting the 25 VDC power to the relays 73 and 74 for the fabric dryer motor 72 and the heater 39. When the fabric dryer door switch 75 is sensed open by the microcontroller 25, a relay transistor for the fabric dryer motor 72 located within the transistor and resistor array 89 and transistor 131 are separately turned off by the microcontroller 25. The relay transistor for the fabric dryer motor 72 is serially connected to the emitter of transistor 131 at output 16 of the transistor and resistor array 89. Both of these transistors must be capable of being toggled before operation of the fabric dryer 10 is permitted. The state of the relay transistor for the fabric dryer motor 72 and transistor 131 are sensed at input "S1" of the microcontroller 25 through amplifier 101.

The fabric dryer drive motor 72 in this embodiment of the invention is energized by 120 VAC between power conductors 81 and 82 and the heater 39 for the fabric dryer 10 is energized by 240 VAC between power conductors 81 and 83. Once the switch 77 for the motor relay 73 has been closed by energization of the coil 78 through transistor 131, a circuit is completed from conductor 81 through the relay switch 77, through the thermal protector 132, through the start and run windings 133 and 134 and through the centrifugal switch 135 to conductor 82. When the drive motor 72 has achieved run speed, the pair of internal centrifugal switches 135 and 137 will each be operated allowing the motor run winding 134 to operate alone and allowing the heater 39 to be energized between connectors 81 and 83 if the switch 87 for the heater relay 74 has been closed by energization of the relay coil 88 through output 11 of the transistor and resistor array 89.

If both the automatic washer 12 and the fabric dryer 10 are operating and one of the two appliances 10 or 12 completes its cycle of operations, the combined appliance program will check a subroutine flag set when the other appliance started its cycle of operations and if the subroutine flag is still set the microcontroller 25 will not be powered down. When this subroutine flag is cleared, indicating that both appliances 10 and 12 have completed their cycles, the microcontroller 25 will be allowed to power down.

Also shown in FIG. 8 is a thermistor 79 which is physically located in the fabric dryer 10 for sensing the temperature of the airflow through the fabric dryer 10. The thermistor 79 provides a continuous backup sensing system for the 155° cycling thermostat 136 and a continuous temperature sensing input to the microcontroller 25. The thermistor 79 and variable resistor 139 form a feedback component to provide the negative oscillation for an oscillator circuit with resistor 139 being operable for adjusting the frequency of the circuit especially during manufacture to compensate for tolerances and various timing delays. Resistor 140 is a feedback component for providing the positive oscillation for the oscillator circuit. Capacitor 141 and the resistance of thermistor 79 determine the frequency of oscillation. Resistors 142 and 143 provide a reference voltage from which the circuit can oscillate an resistor 144 pulls down the output voltage of the amplifier 145.

The microcontroller 25 monitors the frequency of the oscillator circuit which varies as the resistance of the thermistor 79 varies with changes in temperature. The microcontroller 25, through the thermistor 79, limits operation of the fabric dryer 10 to temperatures between approximately −32° F. and 175° F. If the oscillation frequency is higher than the frequency corresponding to the upper temperature limit, it is an indication that the fabric dryer 10 is operating at too high a temperature and that the thermistor 79 or the 155° F. cycling thermostat 136 have failed.

When the fabric dryer 10 is in a low temperature drying program where the upper limit of the airflow temperature is to be in the general vicinity of 140° F., the thermistor temperature sensing circuitry 103 is used as a means for regulating the airflow temperature. The airflow temperature is regulated by the microcontroller 25 controlling operation of the heater relay 74. The thermistor circuitry 103 in combination with the microcontroller 25 thus take the place of a 140° F. cycling thermostat for this low temperature drying program. If the heater relay 74 should fail in a contact closed posture when in this mode of operation, the 155° cycling thermostat 136 will control the circuit as a back-up device.

If, for some reason, the frequency of oscillation is below a predetermined value, such as could exist if the temperature of the air surrounding the thermistor 79 is less than −32° F. or if one of the connections is off the thermistor 79, the microcontroller 25 will terminate operation of the fabric dryer 10 and cause a "6E" to be displayed in the fabric dryer display 33.

Generally, there are two conditions which will cause the fabric dryer 10 to operate at a too hot temperature, either the calibration of the thermistor 79 is off or the cycling thermostat 136 is bad. Both of these conditions will cause the oscillator circuit to operate at an elevated frequency. The microcontroller 2 will detect this elevated frequency and will terminate operation of the cycle and cause a "7E" code to be displayed in the display 33 of fabric dryer 10. The fabric dryer 10 will remain inoperable until corrective action, such as replacing the thermistor 79 or cycling thermostat 136, has been taken by a service person.

Referring now to FIG. 9, there is shown a timing chart for the data signals which are output by the display driver 92 at outputs "3" and "11"; outputs 2, 4–10, 23–38, 35–40 to the displays 32 and 33 and LED array 34; and at outputs "12–18" to the transistor and resistor array 89. The display driver 92 outputs data signals every 8.3 milliseconds or each cycle of a 120 Hz. clock. FIG. 9 best shows how the timing is arranged to enable the microcontroller 25 to control the individual or concurrent operation of at least a pair of appliances, which are in this embodiment, an automatic washer 12 and a fabric dryer 10.

In FIG. 9, during the first 8.3 milliseconds clock pulse 146 output on output 3 of the display driver 92, the microcontroller 25 updates the LEDs 34 and display 32 for the automatic washer 12 through the appropriate outputs of the display driver 92 as generally indicated by the pulse trace 149 on line 150 which takes about 0.1 millisecond. During this clock pulse 146, the microcontroller 25 goes through the program routines for the automatic washer 12 and fabric dryer 10 which takes only a fraction of the 8.3 milliseconds clock pulse 146 as generally indicated by the pulse traces 160 and 161 on lines 153 and 154. Also, during this clock pulse 146, the microcontroller 25 will output data on outputs 12-18 of the display driver 92 to the transistor and resistor array 89 to the appropriate relays and solenoids. The output to the transistor and resistor array 89 is depicted by the pulse trace 163 on line 159 of FIG. 9. The next clock pulse 155, 8.3 milliseconds later than clock pulse 146 and output on output 11 of the display driver 92, updates the LEDs 34 and display 33 of the fabric dryer 10. This updating is indicated by the pulse trace 151 at line 152 in FIG. 9. During this clock pulse 155, the keyboard 26 is serviced as indicated by pulse trace 162 on line 156 of FIG. 9 and the relays and solenoids are updated as shown by pulse trace 163 on line 159. Thus, the microcontroller 25 will, by alternately outputting data to one appliance 10 or 12 and then the other appliance 10 or 12, control the operation of at least a pair of appliances. The LEDs 34 and displays 32 and 33 for the automatic washer 12 and the fabric dryer 10 are updated every other clock pulse 146 or 155 on an alternating basis and similarly the automatic washer 12 and fabric dryer 10 programs and keyboard service are updated. Only the outputs to the transistor and resistor array 89 are updated every clock pulse 146 and 155 to latch the operation of components which are driven through the transistor and resistor array 89.

There has thus been shown a microcontroller based system for controlling the mutually independent operation of a plurality of associated appliances through preselected cycles of operation on a single or concurrent basis with a single control. While the preferred embodiment of the invention depicts a combined laundry appliance with a fabric dryer supported above an automatic washer and with a control panel located on the fabric dryer there are multiple arrangements of appliances which could be utilized with this control system. In the control system disclosed herein each appliance is separately connected to a source of line current and the control system is powered from one of the appliances with low voltage wiring interconnecting the controlled appliances.

In the drawings and specification, there has been set forth a preferred embodiment of the invention and although specific terms are employed, these are used in a generic and descriptive sense only and not for purposes of limitation. Changes in the form and proportion of parts as well as the substitution of equivalents are contemplated as circumstances may suggest or render expedient without departing from the spirit or scope of the invention as further defined in the following claims.

I claim:

1. A control system for controlling the operation of a plurality of associated appliances, comprising: power supply means providing line current to each of said appliances; control panel means including selection means for inputting cycle information corresponding to each of said appliances and further including display means for each of said appliances; a single control means including microcontroller means in communication with said selection means and said power supply means and operable for controlling each of said appliances through independent cycles of operations; and low voltage interconnecting means between said control means and each of said appliances for carrying operational data signals from said control means to each of said appliances to effect selective and independent operation of one or concurrent and independent operation of more than one of said appliances.

2. A control system as defined in claim 1 wherein said control panel means is mounted on one of said appliances.

3. A control system as defined in claim 1 wherein said low voltage interconnecting means includes low voltage cabling between said control means and at least one of said appliances.

4. A control system for controlling the operation of a plurality of associated appliances, comprising: power supply means for providing line current to each of said appliances; control panel means associated with at least one of said appliances including selection means for inputting cycle information corresponding to each of said ppliances and further including display means for each of said appliances; a single control means including microcontroller means in communication with said selection means and said power supply means and operable for controlling each of said appliances through independent cycles of operation, said control means further including driver means for receiving data signals from said microcontroller means and for outputting data signals to each cf said appliances and said display means for effecting selective and independent operation or modification of operation of one or concurrent and independent operation or modification of operation of more than one of said appliances; and low voltage interconnecting means between said control means and each of said appliances for carrying said data signals to each appliance.

5. A control system for controlling the operation of a plurality of associated appliances, comprising: power supply means for providing line current to each of said appliances; control panel means associated with one of said appliances including selection means for inputting cycle information corresponding to each of said appliances and further including display means for each of said appliances; a single control means including microcontroller means in communication with said selection means and said power supply means and operable for controlling each of said appliances through independent cycles of operation, said control means further including driver means for receiving data signals from said microcontroller means and for outputting data signals to control operation of said appliances and said display means, said driver means having at least a pair of outputs and multiplexing means and operable for outputting a series of multiplexed data signals on said pair of outputs to said appliances, display means and selection means whereby said control means is operable for effecting selective and independent operation of one or concurrent and independent operation of more than one of said appliances; and low voltage interconnecting means between said control means and each of said appliances for carrying said data signals to each appliance.

6. A control system as defined in claim 5 wherein said control means further includes circuit means for monitoring the output of at least one of said pair of driver outputs to detect the presence of said data signal and for deenergizing said control means if said data signal is not present.

7. A control system as defined in claim 6 wherein said low voltage interconnecting means includes low voltage cabling between said control means and the other of said plurality of associated appliances.

8. A control system for controlling the operation of a plurality of associated appliances, comprising: power supply mean for providing line current to each appliance; control panel means mounted on one of said appliances including selection means for inputting cycle information corresponding to each of said appliances and further including display means for each of said appliances; a single control means including microcontroller means in communication with said selection means and said power supply means and operable for controlling each of said appliances through independent cycles of operation, said control means further including driver means for receiving data signals from said microcontroller means and for outputting data signals to control operation of each of said appliances and said display means, said driver means having at least a pair of outputs and multiplexing means and operable for outputting a series of multiplexed data signals on said pair of outputs with a first data signal driving said display means for one appliance and updating the operating program of each appliance and a second data signal driving said display means for the other appliance and servicing said selection means; and low voltage interconnecting cabling between said control means and each cf said appliances for carrying said data signals to each appliance.

9. A control system as defined in claim 8 wherein said control panel means and said control means are mounted on one of said appliances.

* * * * *

UNITED STATES PATENT AND TRADEMARK OFFICE
CERTIFICATE OF CORRECTION

PATENT NO. : 4,510,778
DATED : April 16, 1985
INVENTOR(S) : Curran D. Cotton

It is certified that error appears in the above-identified patent and that said Letters Patent are hereby corrected as shown below:

| | |
|---|---|
| Col. 5, line 31 | "connect" should be -- connected -- |
| Col. 5, line 33 | "switches 28" should be -- switches 29 -- |
| Col. 8, line 40 | "2" should be -- 25 -- |
| Claim 4, line 7 | "ppliances" should be -- appliances -- |
| Claim 4, line 15 | "cf" should be -- of -- |
| Claim 8, line 3 | "mean" should be -- means -- |
| Claim 8, line 25 | "cf" should be -- of -- |

Signed and Sealed this

Third Day of September 1985

[SEAL]

Attest:

DONALD J. QUIGG

Attesting Officer    Acting Commissioner of Patents and Trademarks - Designate